United States Patent [19]

Sturgis

[11] Patent Number: 5,398,987
[45] Date of Patent: Mar. 21, 1995

[54] TOOL BOX ASSEMBLY

[76] Inventor: John C. Sturgis, 710 B Pine Burr, Kilgore, Tex. 75662

[21] Appl. No.: 100,245

[22] Filed: Aug. 2, 1993

[51] Int. Cl.⁶ .................................................. B60R 11/06
[52] U.S. Cl. .................................. 296/37.6; 312/311; 224/42.42
[58] Field of Search ..................... 296/37.1, 37.6; 224/42.32, 42.42, 42.43, 42.44; 312/310, 311, 902; 206/372

[56] References Cited

U.S. PATENT DOCUMENTS

| | | | |
|---|---|---|---|
| 2,286,427 | 6/1942 | Levensten | 312/902 X |
| 2,516,116 | 7/1950 | Hammond | 312/311 X |
| 3,446,545 | 5/1969 | Horlacher | 312/311 |
| 4,085,961 | 4/1978 | Brown | 296/37.6 |
| 4,469,364 | 9/1984 | Rafi-Zadeh | 224/4.42 X |
| 4,518,189 | 5/1985 | Belt | 224/42.32 X |
| 4,789,195 | 12/1988 | Fletcher | 296/37.6 |
| 4,971,234 | 11/1990 | Hay | 224/42.32 |
| 5,037,153 | 8/1991 | Stark | 296/37.6 |
| 5,076,630 | 12/1991 | Henriquez | 296/37.6 |
| 5,088,636 | 2/1992 | Barajas | 224/281 |
| 5,232,259 | 8/1993 | Booker | 296/37.6 |

FOREIGN PATENT DOCUMENTS 433148  8/1935  United Kingdom ................ 312/311

*Primary Examiner*—Dean J. Kramer
*Attorney, Agent, or Firm*—Brooks & Kushman

[57] ABSTRACT

A tool box assembly for use in a bed of a pick-up truck comprising, a storage container having a bottom, a top, a door attached to the bottom, the door pivotable from a vertical closed position to a horizontal open position and a mechanism for affixing the storage container to the pickup truck bed, a tool box pivotably attached to the storage container, the tool box manually pivotable about a vertical axis between a storage position and an operable position, the tool box disposed substantially within the storage container in the storage position and disposed partially outside the storage box in the operable position, the tool box including a mechanism engageable with the door in the open position for facilitating the pivoting of the tool box between the storage position and the operable position.

7 Claims, 3 Drawing Sheets

TOOL BOX ASSEMBLY

TECHNICAL FIELD

The present invention relates generally to tool box storage assemblies and, more particularly, to a tool box assembly for use in a pick-up truck bed.

BACKGROUND ART

Service and trade persons frequently require the use of load bearing vehicles such as "pick-up" trucks in their daily activities. Vehicles of this type provide substantial storage area needed to carry cargo, materials, supplies and large tools. These same service and trade persons are also known to require the use of hand tools which, for safety and convenience purposes, are generally stored in locked containers such as tool boxes or similar containers. As those skilled in the art will recognize, such hand tools are generally valuable. They must therefore be protected from theft when left unattended.

There are numerous commercially available tool boxes which are designed for storage in proximity to a truck bed. These commercially available tool boxes often lie transverse to the length of the bed and include a pair of lockable covers or "lids" which raise from either side of the tool box. In operation, it is necessary to reach over the top of the box to obtain the desired tools that are stored within the box. It is often very difficult to locate particular tools as these transverse tool boxes are generally simple rectangular boxes with no drawer or segmented sections.

Other commercially available tool boxes are disposed parallel to the length of the truck bed. These tool box designs utilize some of the wasted space lying before and after the wheel wells disposed in the truck bed. These tool boxes include lockable lids which open up away from the tool box requiring stooping or reaching over the side wall of the truck bed to reach into the tool box. Again, it becomes difficult to locate particular tools as these tool boxes are also simply large containers with no segmented sections.

Against this background, it is thus desirable to provide a tool box which utilizes the available space behind the wheel wells in a truck bed but still permits the user or service person full access to the tool box area without unnecessary or uncomfortable reaching.

U.S. Pat. No. 4,085,961 issued to Brown discloses a tool box mount for a pick-up truck. The tool box mount comprises a frame for supporting the tool box and a support means connected to the frame for attaching the frame to the bed of the pick-up truck. The support means permits the frame to swing over the bed from a first position to a second position.

The Brown patent does not solve the problems associated with secure attachment of a tool box to the bed of a pick-up truck to prevent the tool box from being stolen while unattended. The Brown patent discloses the use of a conventional chain and padlock locking mechanism to secure the toolbox to the frame. This prevents the possibility of an unauthorized person removing the tool box from the truck. This locking mechanism is inefficient and incapable of assuring a high degree of security of the tool box when left unattended.

U.S. Pat. Nos. 5,088,636 to Barajas and 5,037,153 to Stark disclose movable tool boxes which are disposed in a transverse manner with relation to the truck bed. These tool boxes do not sufficiently utilize the available space behind the wheel wells of the truck bed. In addition, these transverse tool boxes prevent transportation and storage of cargo immediately behind the wheel wells, in front of the truck tail gate, in the center portion of the truck bed.

SUMMARY OF THE INVENTION

The present invention is a pivotable tool box assembly for use in a pick-up truck bed. The tool box assembly includes a storage container and a tool box. The storage container is affixable to the bed of a pickup truck. The storage container includes at least a bottom, a top, a pair of spaced apart side supports and a door pivotably attachable to the bottom. The door is displaceable between a vertical closed position and a horizontal open portion.

The tool box has means for pivoting the tool box about a vertical axis from a storage position within the storage container to an operable position partially outside the storage container. Rollers are provided on the tool box which rollingly engage the surface of the door of the storage container when the door is in the open position to facilitate the pivoting of the tool box between the storage position and the operable position.

It is an object of the present invention to provide a tool box assembly including a tool box which moves from a first secure position inside a storage container to a second operable position which is easily accessible by a service person from the rear of the pick-up truck bed.

It is another object of the present invention to provide a tool box assembly including a tool box and a storage container wherein the tool box is secured from theft by being stored in a storage container location in the unused space behind the wheel well.

It is a further object of the present invention to provide a tool box which pivots from a storage position substantially within a storage container to an operable position outside the storage container.

It is a still further object of the present invention to provide a tool box which pivots from a storage position to an operable position while the tool box travels along the opened front door of the storage container.

It is yet another object of the present invention to provide a tool box having a removable tool box support platform which has means for movably supporting the tool box and a locking assembly affixed to the support platform for securing the tool box in the storage position.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
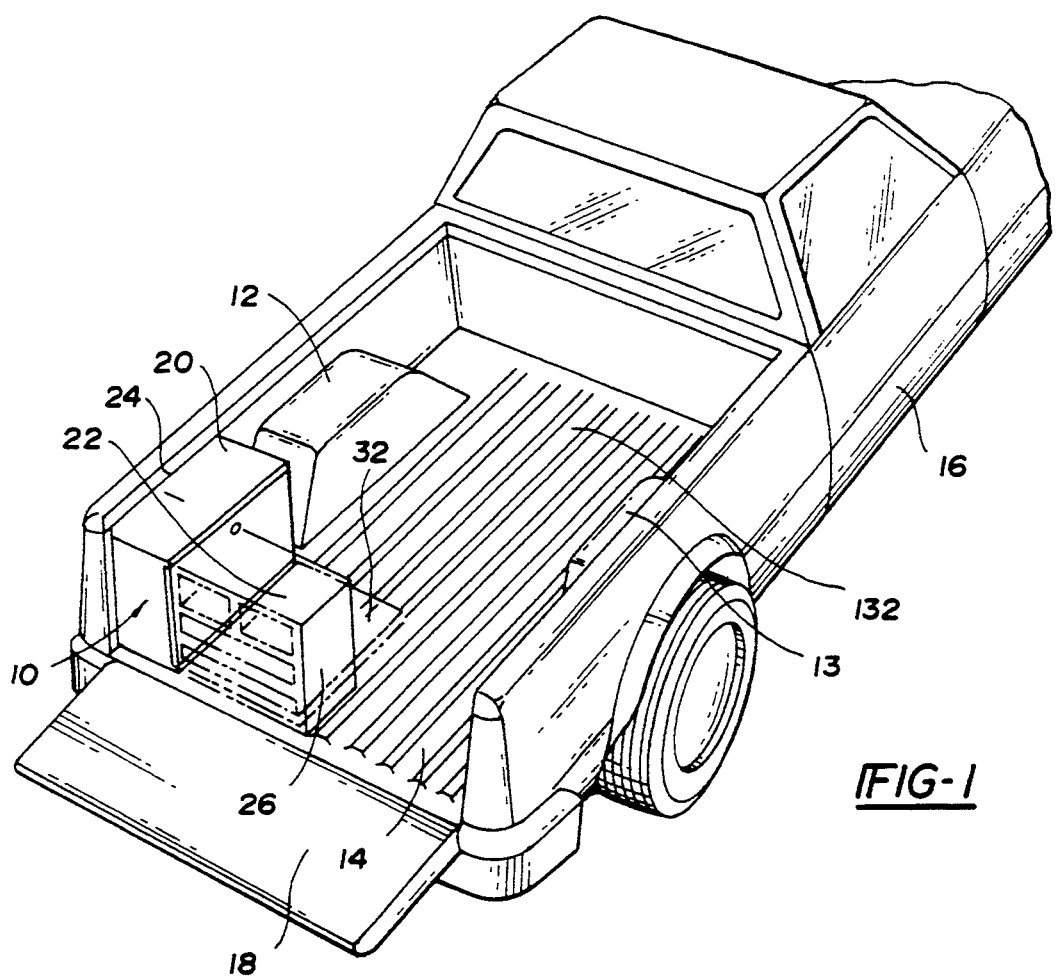
FIG. 1 is a perspective view of a pick-up truck showing the tool box assembly of the present invention in a storage position and in an operable position.

Referring now to FIG. 1, there is shown generally tool box assembly 10 disposed behind wheel well 12 inside the bed 14 on pick-up truck 16. A tailgate 18 is shown in an open position. FIG. 1 shows a preferred location of the tool box assembly 10 within the bed 14 of the pick-up truck. The tool box assembly 10 consists of a storage container 24 and a tool box 26 pivotably attached to the storage container 24.

Storage container 24 is comprised of a bottom 28, a top 30, and a door 32. Storage container 24 may further include a pair of spaced apart side walls 34 and 36. Storage container 24 may be manufactured from sheet metal, aluminum or a high grade structural plastic material.

Figure 2:
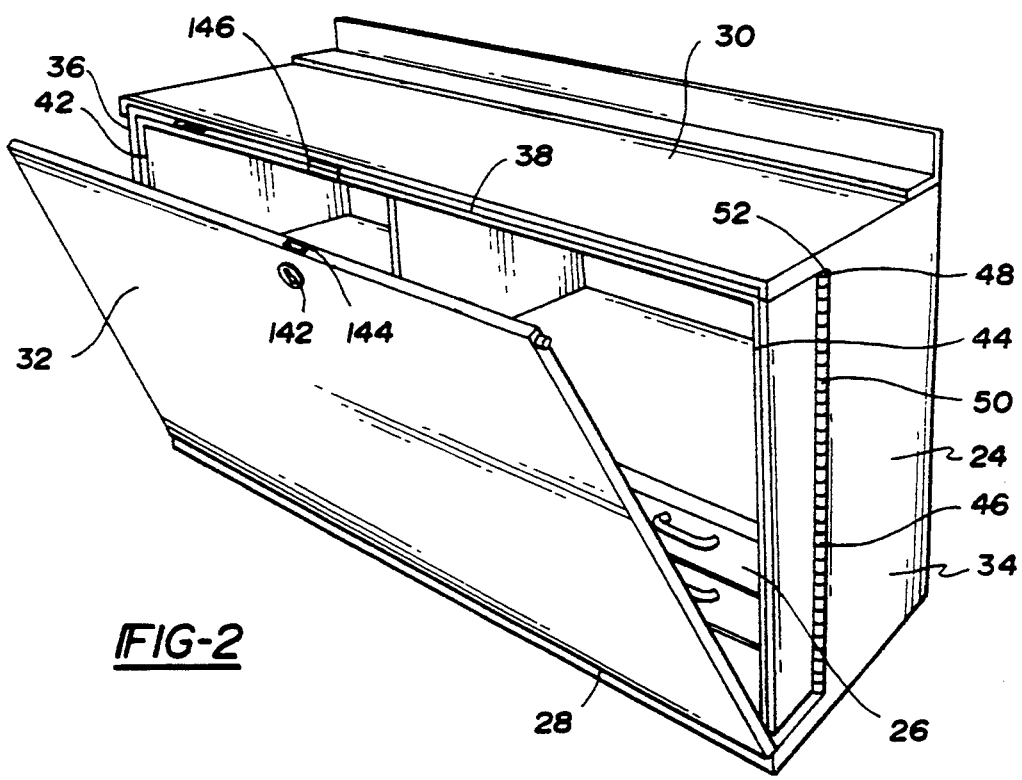
FIG. 2 is a perspective view of the tool box assembly of the present invention.
Figure 3:
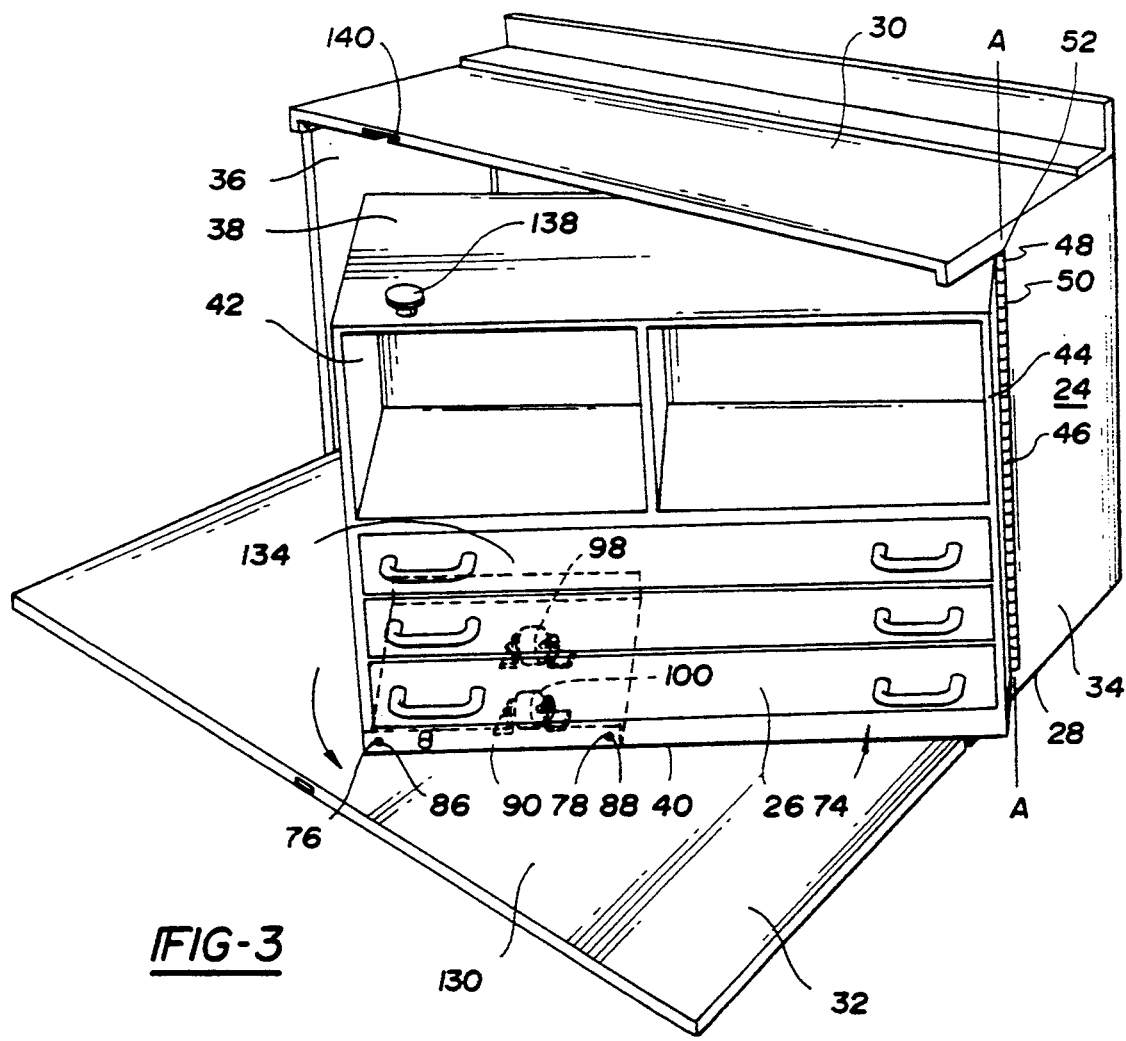
FIG. 3 is a perspective view of the tool box assembly of the present invention illustrating the tool box pivoted to a partially operable position.

In FIG. 2 the tool box 26 is shown in a stored position completely within storage container 24 and in an operable position partially outside storage container 24 in FIG. 3. Tool box 26 includes a top 38, a bottom 40 and a pair of spaced apart side walls 42 and 44.

Tool box 26, may also be manufactured from sheet metal, aluminum or a high grade plastic material. As illustrated in FIGS. 2 and 3, a hinge 46 allows tool box 26 to pivot from the storage position to the operable position about vertical axis A. Hinge assembly 46 is comprised of a first hinge portion 48 and a second hinge 50. First hinge 48 is affixed to side wall 44 of tool box 26. Cooperable second hinge portion 50 is disposed on side wall 34 of storage container 24. A connecting rod 52 is cooperably engaged within both first hinge portion 48 and second hinge portion 50 to form operable hinge assembly 46.

Figure 5:
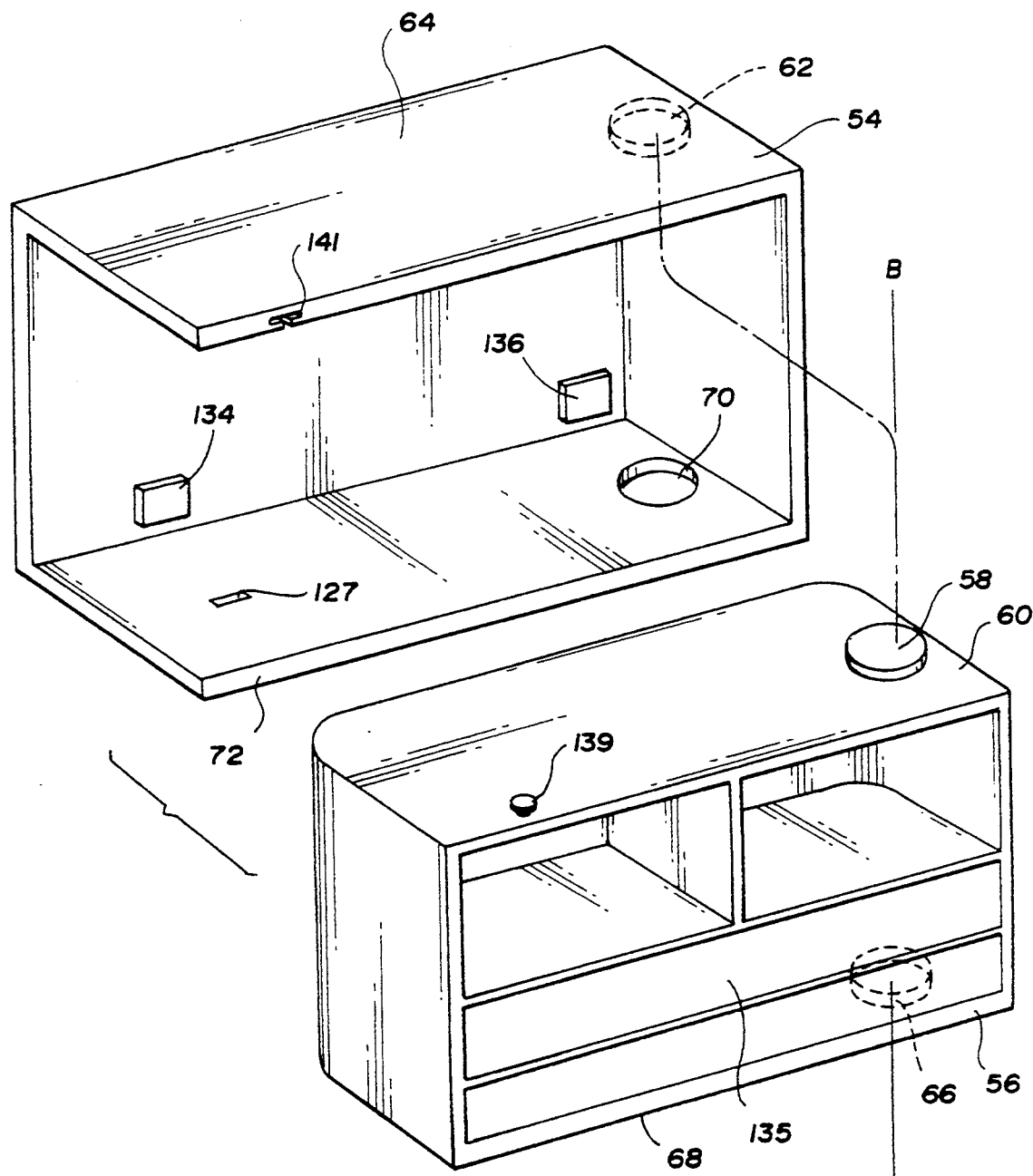
FIG. 5 is a perspective exploded view of an alternative tool box assembly of the present invention.

Referring now to FIG. 5, there is illustrated alternative embodiments of the storage container 54 and the tool box 56. Tool box 56 pivots about a vertical axis B in substantially the same manner as the tool box 26 shown in FIG. 3 except that a different means for pivoting the tool box in relation to the storage container is utilized. A circular bearing member 58 is provided on top 60 of tool box 56 which is received within a cooperating circular journal 62 provided within top wall 64 of storage container 54. A similar circular bearing member 66 is provided on bottom 68 of tool box 56 and is received in cooperating circular journal 70, provided within the base 72 of storage container 54.

Circular bearing members 58 and 66, in cooperation with circular journals 62 and 70, provide a means for pivoting tool box 56 about vertical axis B in relation to storage container 54. Circular bearing members 58 and 60 may be lubricated to allow free movement within circular journals 66 and 70, respectively.

Figure 4:
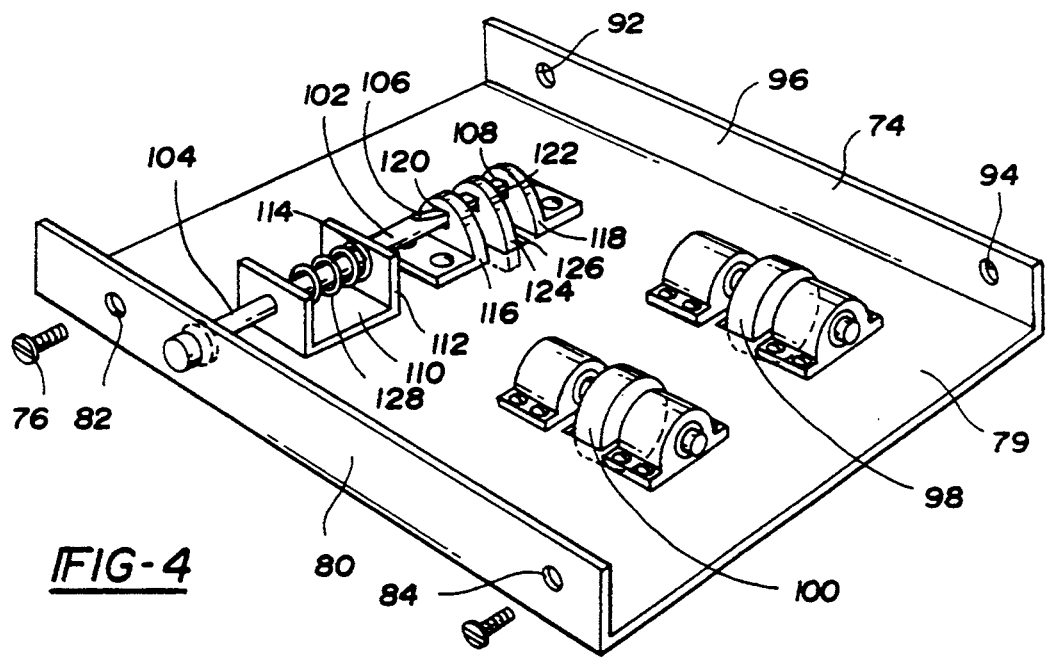
FIG. 4 is a fragmentary perspective view of the tool box support platform of the present invention.

Referring now to FIG. 4, there is shown a support platform 74. Support platform 74 is affixable to tool box 26 as shown in FIG. 3. Support platform 74 is received underneath storage container 54. Support platform 74 may be fastened to tool box 26 not shown in FIG. 3 through the use of any common fastener system. Support platform 74, as shown in FIG. 3, is fastened to tool box 26 by the use of common screws 76 and 78. Support platform 74 has a base 79, a front wall 80 with a pair of fastening apertures 82 and 84 defined therein. Fasteners 76 and 78 extend through a pair of fastening apertures 86 and 88 disposed within front panel 90 of tool box 26. FIG. 4 shows a similar pair of fastening apertures 92 and 94 disposed within rear wall 96 of support platform 74. Support platform 74 is affixed to a rear segment, not illustrated, of tool box 56 in substantially the same manner as disclosed with respect to front segment 90.

Support platform 74 further includes a pair of rollers 98 and 100 rotatably attached to the base 79 and a locking assembly 102. Locking assembly 102 includes elongate rod 104 having a tapered segment 106 adjacent to an internal end 108. Elongate rod 104 is supported by truss member 110 affixed to the base 79 of the support platform 74. Truss member 110 has at least one vertical leg 112 having a support aperture 114. Adjacent to truss member 110 is a pair of spatially separate shoulder members 116 and 118, respectively. Shoulder members 116 and 118 are affixed to the base 79 of support platform 74.

The pair of shoulder members 116 and 118 include respective axially aligned throughbores 120 and 122. An actuating member 124 is supported on the elongate rod 104 between shoulders 116 and 118. Actuating member 124 is configured to be cooperatively received within locking hole 126 provided in the base 79 of the support platform 74.

A resilient member such as biasing spring 128 circumscribes elongate rod 104 and produces a force urging elongate rod 104 in a direction away from shoulder members 116 and 118. As rod 104 is moved in a horizontal direction, tapered segment 106 moves actuating member 124 in a vertical direction.

Attention is now turned to the operational characteristics of the tool box assembly of the present invention. As shown in FIG. 1, the tool box 26 is pivotable from a storage position within the storage container 24 to an operable position 22 outside the storage container adjacent the opened tailgate 18 as shown in phantom. As illustrated in FIG. 3, tool box 26 pivots about a vertical axis out of the storage container 24. The rollers 98 and 100 shown in FIG. 4, roll along the inner surface 130 of door 32. Substantially planar inner surface 130 of door 32 provides a flat surface for the rollers 98 and 100 of the tool box 26. As is known in the art, commercially available pick-up trucks invariably include a plurality of longitudinally extending corrugations such as corrugations 132. Pivoting tool box 26 along planar surface 130 substantially increases the ease of movement of tool box 26 between the storage position and the operable position. Pivoting tool box 26 along and across longitudinally extending corrugations 132 would be difficult as tool box 26 would have to oscillate in a vertical direction in relation to the height of the individual corrugations.

As is further shown in FIG. 1, the tool box assembly of the present invention allows for utilization of the wasted space behind wheel well 12 within the bed 14 of the pick-up truck 16. Upon pivoting tool box 26 from a storage position to the operable position adjacent tailgate 18, tradepersons or servicepersons are provided full access to tool box 26 without having to reach over the side walls of the bed or crawl inside. In addition, the pivotability of the tool box assembly of the present invention calls for full utilization of space within truck bed 14 between the wheel wells 12 and 13. For example, it is known in the art that tradespersons or servicepersons often transport various planar wall sections such as dry wall, sheets of plywood or oxboard, which are commonly manufactured in 4 foot by 8 foot planar sheets. Thus, it becomes necessary to be able to utilize the complete lateral space between wheel wells 12 and 13 which is often four feet and the length of the truck bed 14 which is eight feet. Utilization of prior art transverse lying tool box assemblies of the prior art often hindered utilization of this space. The tool box assembly of the present invention being pivotable from a storage position behind the wheel well to an optimal position adjacent tailgate 18 allows for utilization of this space and easier access to tool box 26.

The tool box assembly of the present invention is particularly useful when utilized in conjunction with a truck cap or cover which commonly extends over and encloses truck bed 14. The tool box assembly of the present invention allows for utilization of wasted space behind wheel well 12 while allowing full access to tools within tool box 26 when used in conjunction with a truck cap or truck cover not shown. Tool box storage containers of the prior art disposed transversely to the truck bed or in front or behind wheel wells 12 or 13 require opening of tail gate 18 to an open position as shown in FIG. 1. If the tool box assembly of the prior art is located transversely the trade or service person must crawl within the enclosure made by the truck bed and truck cap not shown to access the tools. The tool box assembly of the present invention can be accessed simply by lowering tailgate 18 and pivoting tool box 26 from the storage position to the operable position.

As can be seen from FIGS. 3 and 5, the tool boxes 26 and 56 respectively include various designs having any number of drawers 134 and 135 respectively. A particular configuration of the tool box 26 or 56 will depend upon the particular applications and work carried out by the trade or service person.

Support platform 74 is unitary in design and can be easily affixable to the bottom of tool box 26 as shown in FIG. 3. Locking assembly 102 allows tool box 26 to be stored within storage container 24 in the locked position. Referring now to FIG. 4, it can be seen that actuating member 124 extends through hole 126 provided in the base of the support platform 74. Actuating member 124 further extends into hole 127 located in bottom of the storage container 54 as shown in FIG. 5. If actuating member 124 is disposed within hole 127, tool box 56 is held in the storage position within storage container 54. Upon pushing elongate rod 104 in a horizontal direction, tapered segment 106 lifts actuating member 124 out of hole 127 and allows tool box 56 to be pivoted from the storage position to the operable position. Biasing spring 28 biases elongate rod 104 away from shoulder members 116 and 118. Upon release of elongate rod 104, biasing spring 28 returns the elongate rod to its initial position and actuating member 124 returns to its lowered position engaged in hole 127. Thus, locking assembly 102 allows tool box 56 to be secured in the storage position within storage container 54.

Still referring to FIG. 5, it can be seen that shock absorber members 134 and 136 are affixed to the rear wall of the storage container 54. When the tool box 56 is stored in the storage position, shock absorber members 134 and 136 engage the rear surface of the tool box 56 and act to reduce vibration and noise associated with transporting tool box assembly over various terrains. Shock absorber members 134 and 136 can be made of any polymeric foam or hard plastic material.

As shown in FIG. 3 tool box 26 further includes a security latch 138. Security latch 138 extends from top 38 of tool box 26. Security latch 138 is received within channel 140 provided in the top 30 of the storage container. If security latch 138 is received within channel 140, storage container top wall 30 is secured to tool box 26. In this manner, tool box 26 and its contents are safely locked in a stored position when door 32 is closed and the tool box assembly is left unattended. Door 32 completely forecloses opening or removal of drawers 26 while door 32 is in the locked position.

Similarly, in FIG. 5 tool box 56 includes a security latch 139. Security latch 139 extends from top wall 60 of tool box 56. Security latch 139 is received within channel 141. If security latch 139 is received within channel 141, storage container top 64 is secured to tool box 56. In this manner, tool box 56 and its contents are safely locked in a stored position when door 32 is closed and the tool box assembly is left unattended. Door 32 completely forecloses opening or removal of drawers 135 while door 32 is in the locked position.

Door 32 includes a locking mechanism 142. Locking mechanism 142 can be of any conventional key and tumbler design with a linear extending latch 144 which upon actuation extends into a receiving channel 146 shown in phantom in FIG. 2.

While this invention has been described fully and completely with emphasis upon the preferred embodiment, it should be understood that within the scope of the appended claims the invention may be practiced otherwise than as specifically described herein.

What is claimed is:

1. A tool box assembly for use in a bed of a pick-up truck comprising:
 a storage container affixable to said bed, said storage container having a bottom, a top, a door attached to said bottom, said door pivotable from a vertical closed position to a horizontal open position;
 a tool box pivotably attached to said storage container, said tool box manually pivotable about a vertical axis between a storage position and an operable position, said tool box disposed substantially within said storage container in said storage position and disposed partially outside said storage box in said operable position;
 said tool box including one or more rollers engageable with said door in said open position for facilitating said pivoting of said tool box between said storage position and said operable position;
 a vertically extending hinge; and
 a stabilizing locking member extending from said top of said tool box and receivable in a cooperating channel provided within said top of said storage container wherein said locking member is received within said channel when said tool box is in said storage position.

2. The tool box assembly as in claim 1 wherein said tool box has a circular bearing member extending from said base of said tool box and said storage container has a cooperating circular journal, said circular bearing member pivotably supported within said circular journal for pivotably connecting said tool box to said storage container.

3. The tool box assembly as in claim 2 wherein said tool box further includes a second circular bearing member extending from said top of said tool box and a second cooperating circular journal provided within said top of said storage container, said second circular bearing member pivotably supported within said second circular journal for pivotably connecting said tool box to said storage container.

4. A tool box assembly for use in a bed of a pick-up truck comprising:
 a storage container affixable to said bed, said storage container having a bottom, a top, a door attached to said bottom, said door pivotable from a vertical closed position to a horizontal open position;

a tool box pivotably attached to said storage container, said tool box manually pivotable about a vertical axis between a storage position and an operable position, said tool box disposed substantially within said storage container in said storage position and disposed partially outside said storage box in said operable position;

said tool box including one or more rollers engageable with said door in said open position for facilitating said pivoting of said tool box between said storage position and said operable position; and a rear wall extending from said top to said bottom and at least one shock absorbent member attached to said rear wall, said at least one shock absorbing member engaging said tool box in said storage position to reduce the vibration of said tool box within said storage container.

5. A tool box assembly for use in a bed of a truck comprising:

a storage container affixable to said bed, said storage container having a bottom, a top, a door attached to said bottom, pivotable from a vertical closed position to a horizontal open position:

a tool box pivotably attached to said storage container, said tool box pivotable about a vertical axis between a storage position and an operable position, said tool box being substantially disposed within said storage container in said storage position and being partially disposed outside said storage box in said operable position; and a support platform attached to said tool box, said support platform including a means for rollingly supporting said support platform and a means for locking said support platform in a stationary position, said rolling means allowing pivotable movement of said tool box and support platform about said vertical axis, said rolling means rollingly engaging said door in said open horizontal position facilitating the pivoting of said tool box between said storage position and said operable position.

6. A tool box assembly as in claim 5 wherein said means for locking said support platform in a stationary position comprises:

an elongate member having a tapered segment on one end;

a truss member affixed to said support platform including at least one extending leg member, said leg member having a support aperture provided therethrough, said elongate member passes through said support aperture and slidably supports said elongate member in a horizontal position;

a first shoulder member affixed to said support platform adjacent said truss member, said shoulder member having a throughbore;

a second shoulder member affixed to said support platform adjacent said first shoulder member, said second shoulder member having a throughbore coaxial with said first shoulder member throughbore;

an actuating member disposed between said first and second shoulder members, said actuating member cooperable with a locking hole provided in said bottom of said support container to lock said support platform in said stationary position, said actuating member including an opening receiving said tapered segment of said elongate member, said tapered segment translating a horizontal displacement of said elongate member into vertical displacement of said actuating member, said vertical displacement between a locking position and a free position wherein said actuating member is partially disposed within said locking hole in said locking position and is completely outside said locking hole in said free position.

7. The tool box assembly as in claim 6 further comprising a spring member biasing said elongate member in a horizontal direction selected to place said actuating member in said locking position.

* * * * *